(12) United States Patent
Manak et al.

(10) Patent No.: US 7,938,060 B2
(45) Date of Patent: May 10, 2011

(54) BREADCRUMB MANUFACTURING SYSTEM AND METHOD

(75) Inventors: George Manak, Cedartown, GA (US); David J. Neff, Chattanooga, TN (US); Jerry D. Kuhn, Rome, GA (US); Bruce A. Crist, Rome, GA (US); Thomas Brümmer, Gallen (CH); Markus Meyer, Egnach (CH); Markus Mauchle, Bischofszell (CH)

(73) Assignee: Southeastern Mills, Inc., Rome, GA (US)

( * ) Notice: Subject to any disclaimer, the term of this patent is extended or adjusted under 35 U.S.C. 154(b) by 1157 days.

(21) Appl. No.: 10/711,346

(22) Filed: Sep. 13, 2004

(65) Prior Publication Data

US 2006/0053650 A1   Mar. 16, 2006

(51) Int. Cl.
   *A23L 1/00* (2006.01)
(52) U.S. Cl. .......... 99/361; 426/464; 426/465; 426/516; 426/517; 426/518
(58) Field of Classification Search ........................ None
   See application file for complete search history.

(56) References Cited

U.S. PATENT DOCUMENTS

| | | | |
|---|---|---|---|
| 3,445,239 A | 5/1969 | Viault, Jr. | |
| 4,364,961 A | 12/1982 | Darley et al. | |
| 4,423,078 A | 12/1983 | Darley et al. | |
| 4,440,793 A | 4/1984 | Seki | |
| 4,609,557 A | 9/1986 | Mao et al. | |
| 4,609,558 A | 9/1986 | Giacone et al. | |
| 4,657,770 A | 4/1987 | Slade et al. | |
| 4,833,959 A | 5/1989 | Vietrogoski et al. | |
| 4,943,438 A | 7/1990 | Rosenthal | |
| 6,045,851 A * | 4/2000 | Cross | 426/557 |
| 6,162,481 A | 12/2000 | Bernacchi et al. | |
| 6,277,425 B1 * | 8/2001 | Nash et al. | 426/516 |
| 6,337,084 B1 * | 1/2002 | Stevens et al. | 424/442 |
| 6,399,130 B2 | 6/2002 | Parker | |
| 6,415,708 B2 * | 7/2002 | Huber et al. | 99/348 |
| 6,613,370 B1 | 9/2003 | Picford | |
| 6,656,516 B1 | 12/2003 | Frost et al. | |

FOREIGN PATENT DOCUMENTS

| | | |
|---|---|---|
| EP | 0510320 A1 | 10/1992 |
| EP | 0629082 A1 | 10/1994 |
| EP | 0619082 B1 | 6/1998 |
| FR | 2458227 | 1/1981 |
| GB | 2095529 | 10/1982 |
| JP | 58190348 | 11/1983 |
| JP | 59066838 | 4/1984 |
| JP | 60176556 | 9/1985 |
| JP | 61019462 | 1/1986 |
| JP | 61081758 | 4/1986 |
| JP | 61040742 | 9/1986 |
| JP | 62061567 | 3/1987 |
| JP | 62265951 | 11/1987 |
| JP | 63068061 | 3/1988 |

(Continued)

*Primary Examiner* — Lien Tran
(74) *Attorney, Agent, or Firm* — Sutherland Asbill & Brennan LLP

(57) ABSTRACT

A method of manufacturing breadcrumbs, including the steps of forming a mixture, extruding the mixture to form loaves, surface drying the loaves in a first drying step, comminuting the loaves to form particles having a smaller size than the loaves, and further drying the particles in a second drying step to obtain the breadcrumbs.

17 Claims, 3 Drawing Sheets

FOREIGN PATENT DOCUMENTS

| | | |
|---|---|---|
| JP | 63250301 | 10/1988 |
| JP | 63294754 | 12/1988 |
| JP | 1101857 A2 | 4/1989 |
| JP | 1257424 | 10/1989 |
| JP | 1291755 | 11/1989 |
| JP | 3076573 | 4/1991 |
| JP | 4341148 | 11/1992 |
| JP | 4349857 | 12/1992 |
| JP | 61699705 | 6/1994 |
| JP | 8000204 | 1/1996 |
| JP | 8242775 | 9/1996 |
| JP | 11137215 | 5/1999 |

* cited by examiner

BREADCRUMB MANUFACTURING SYSTEM AND METHOD

TECHNICAL FIELD

The present application relates generally to breadcrumb manufacturing and more particularly relates to a system and a method for manufacturing Japanese style breadcrumbs and other types of breadcrumbs in a fast and efficient manner.

BACKGROUND OF THE INVENTION

Breadcrumbs traditionally may be manufactured by baking an amount of dough, allowing the baked dough to go stale, and then toasting and/or grinding the baked dough into breadcrumbs of an appropriate size. The breadcrumbs then may be used to coat chicken, fish, meat, vegetables, or other types of foodstuffs.

Japanese style breadcrumbs are distinguished in that they are shaped as elongated slivers with a porous structure and low bulk density. Japanese style breadcrumbs may be used to provide a tender texture and crispiness to a variety of fried foods. Japanese style breadcrumbs generally are formed by passing an electric current through the dough to generate heat therein, i.e., a dielectric baking process. The baked dough then may be dried over time and grated. Such known methods, however, may require a significant amount of time to produce acceptable breadcrumbs.

What may be desired therefore is a system and method of manufacturing breadcrumbs, particularly Japanese style breadcrumbs, in a fast and efficient manner. The breadcrumbs preferably can be manufactured without an extended drying period or for the need for the cooked dough to go stale.

SUMMARY OF THE INVENTION

A method of manufacturing breadcrumbs may be described herein. One example may include the steps of forming a mixture, extruding the mixture to form loaves, surface drying the loaves in a first drying step, comminuting the loaves to form particles having a smaller size than the loaves, and further drying the particles in a second drying step to obtain the breadcrumbs.

The mixture may be cooked during the extrusion step. The loaves may be about 10 to about 40 millimeters in diameter and about 10 to about 50 millimeters in length.

The surface drying step may include a drying temperature of about 60° to about 80° Celsius or above about 250° Celsius. The first drying step and/or the further drying step may include a fluid bed dryer.

The comminuting step may include a first cutting step for coarse cutting followed by a second cutting step for fine cutting. The comminuting step also may include a cutting step for a first size reduction followed by a grinding step for a second size reduction.

The surface drying step may be followed by a tempering step to expose the loaves to ambient air. The loaves may be exposed to ambient air for about an hour. The further drying step may be followed by a sizing step.

The mixture may have a water content at the extruding step of about thirty-five to about forty-five percent (about 35 to about 45%). The loaves may have a water content at the surface drying step of about twenty to about twenty-five percent (about 20 to about 25%). The breadcrumbs may have a water content at the drying step of about ten to about three percent (about 10 to about 3%).

A system for manufacturing crumbs from a raw material mixture also may be described herein. One example may include an extruder for extruding the mixture to form loaves having a first size, a first dryer for surface drying the loaves, a comminuting device for comminuting the loaves to form crumbs having a smaller size than the loaves, and a second dryer for further drying the crumbs.

The extruder may be heated. The extruder also may include a cutter. The first and the second dryer may include a fluid bed dryer. The comminuting device may include a first cutter for coarse cutting and a second cutter for fine cutting. Specifically, the comminuting device may include the first cutter for a first size reduction and a grinder downstream of the second dryer for a second size reduction. The system also may include a tempering chamber positioned between the extruder and the comminuting device and a sizing device for sizing the crumbs.

The system also may include a number of vertically extending transport lines connecting the extruder, the first dryer, the comminuting device, and the second dryer. The transport lines may include a number of pneumatic conveying lines. The transport lines also may use gravity for conveying.

The system may include, in series, the first dryer, a first cutter for coarse cutting, a second cutter for fine cutting, the second dryer, and a grinder. The system further may include a first bypass line connected between the first cutter and the second dryer for bypassing the second cutter and a second bypass line bypassing the grinder.

A further system for manufacturing a number of product crumbs may be described herein. The system may include an extruder for forming a number of product loaves, means for drying the product loaves; means for tempering the product loaves, means for cutting the product loaves into the number of product crumbs, and means for drying the product crumbs. The system further may include means for grinding the number of product crumbs and means for sizing the number of product crumbs. The system also may include a number of pneumatic transport means.

A further system for manufacturing a number of product crumbs also may be described herein. The system may include an intake station, an extrusion station, a first drying station, a tempering station, a chopping station, and a further drying station.

These and other features of the present invention will become apparent upon review of the following detailed description when taken in conjunction with the drawings and the appended claims.

DETAILED DESCRIPTION

Figure 1A:
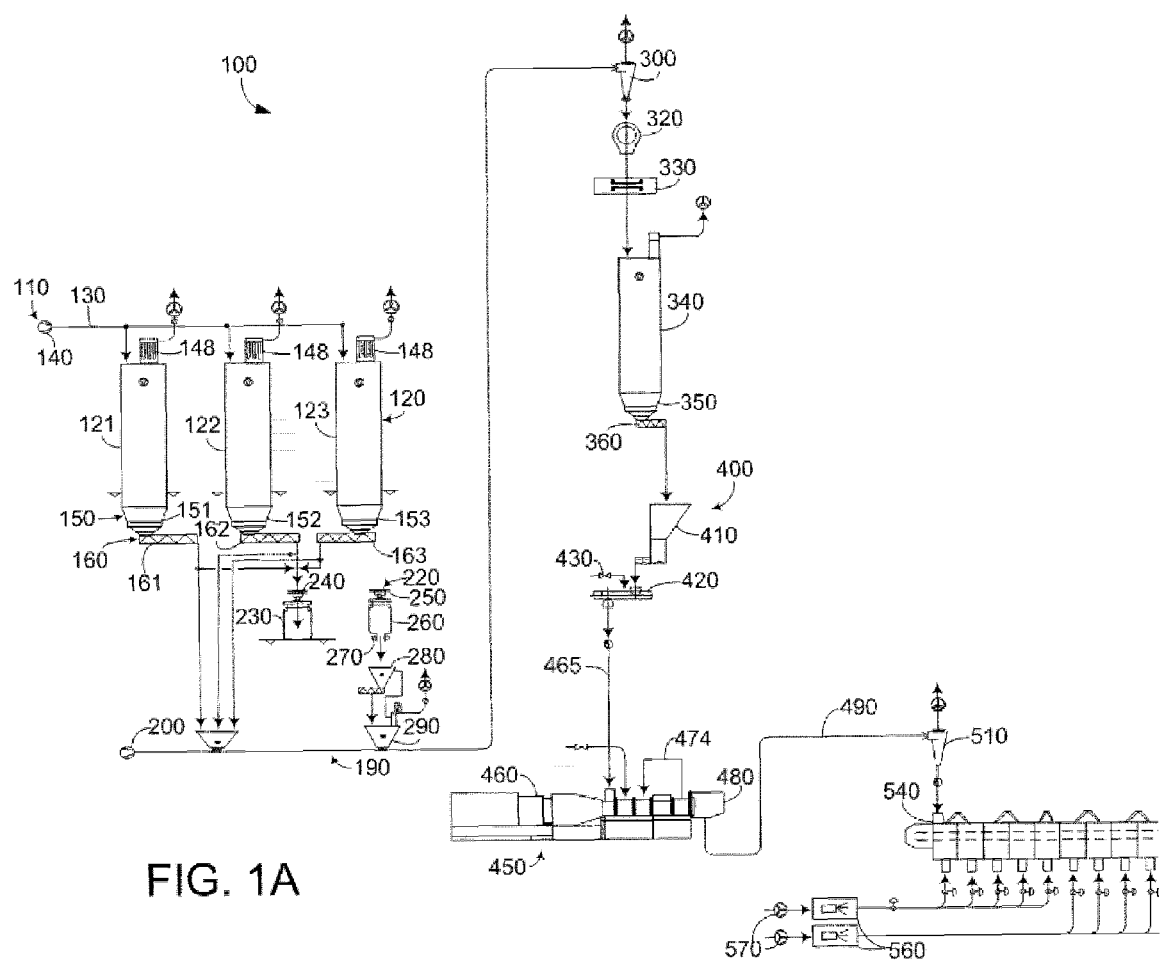
FIGS. 1A-1C are process flow diagrams of a breadcrumb manufacturing system as is described herein.
Figure 1B:
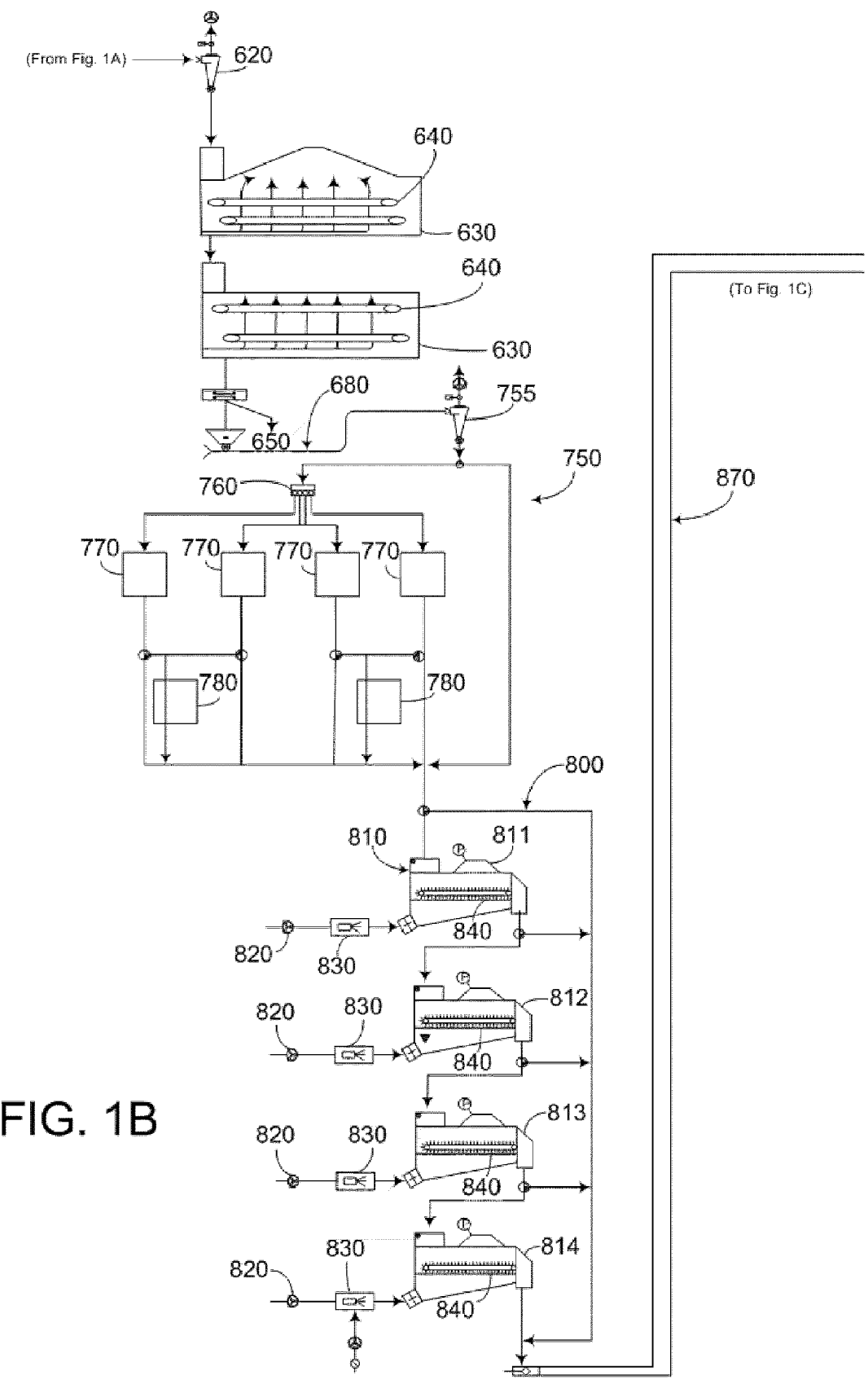
Figure 1C:
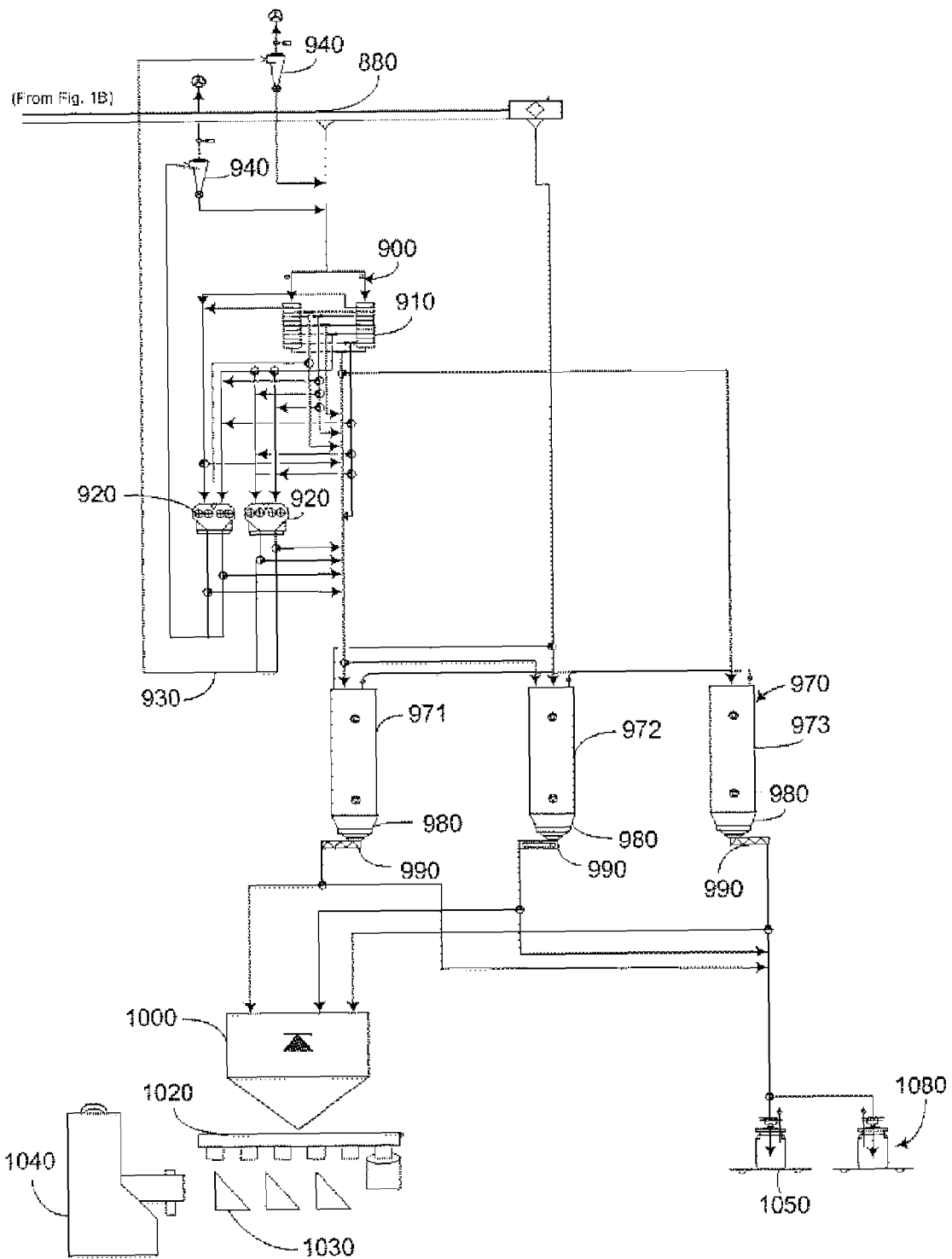

Referring now to the drawings, in which like numerals indicate like elements throughout the several views, FIGS. 1A-1C show a process flow diagram for a breadcrumb manufacturing system 100 as is described herein. The breadcrumbs manufacturing system 100 may take an amount of raw materials and water and produce various types of breadcrumb products, including Japanese style breadcrumbs, American style breadcrumbs, and other desired styles. The raw materials may include various types of flour, starch, salt, sugar, oil, leavening, coloring, and other ingredients in any desired proportion.

The breadcrumb manufacturing system 100 may include a number of different stations, including an intake station 110. The intake station 110 may include a number of raw material bins 120. In this example, a first raw material bin 121, a second raw material bin 122, and a third raw material bin 123. Any number of raw material bins 120, however, may be used. The raw material bins 120 may have the usable capacity of about 2000 cubic feet (about 56.6 cubic meters). The bins 120, however, may have any desired size or shape. The raw material bins 120 may be made out of steel or similar types of materials. The raw material bins 120 may include internal load cells, level probes, filters, inspection doors and access doors. Additional bins 120 may be used for overflow protection.

The raw material bins 120 may be filled in any manner. In this example, an intake pneumatic transport system 130 may be used to transport the raw materials from a mix plant to the raw material bins 120. The intake pneumatic transport system 130 may have conveying capacity of about 60,000 pounds per hour (about 27,215 kilograms per hour). The intake pneumatic transport system 130 may extend for up to about 475 feet (about 144.8 meters) and may include a number of ninety-degree (90°) turns. The intake pneumatic transport system 130 may be made out of steel. The intake pneumatic transport system 130 may have a blower 140 to provide the necessary airflow for the transport of the materials. The blower 140 may include a rotary blower with about a 150 horsepower motor. Any size or speed motor may be used. The blower 140 may use a silencer. The intake pneumatic transport system 130 may have any desired size or operational parameters.

The intake pneumatic transport system 130 also may include one or more diverter valves so as to direct the raw materials to one of the raw material bins 120. The intake pneumatic transport system 130 also may include one or more exhaust fans and discharge air locks. The exhaust fan may have about a 7.5 horsepower motor. The discharge airlock may have about a two (2) horsepower motor. The exhaust fan and the discharge airlock may have any size motor. The exhaust fan and the discharge airlock allow the air driven through the pneumatic transport system 130 to vent. The intake pneumatic transport system 130 also may have one or more filters 148 positioned about the raw material bins 120. The filters 148 may include one or more filter bags positioned therein. The filters 148 may use a reverse pulse cleaning system.

The raw material bins 120 each also may have a vibrating discharger 150 to provide a smooth discharge flow of the raw materials. Specifically, a first vibrating discharger 151, a second vibrating discharger 152, and a third vibrating discharger 153 may be used. Any number of the vibrating dischargers 150 may be used. The vibrating dischargers 150 may have a fully oscillating discharge tray therein driven by a vibratory motor. The raw material bins 120 each also may have a discharge screw conveyor 160. Specifically, a first screw feeder 161, a second screw feeder 162, and a third screw feeder 163 may be used. Any number of the discharge screw conveyors 160 may be used. The discharge screw conveyors 160 provide a continuous flow of the raw materials. The discharge screw conveyors 160 may be driven by about a three (3) horsepower motor. Any size motor may be used.

The discharge screw conveyor 160 may lead, directly or indirectly, to a sifter pneumatic transport system 190. The sifter pneumatic transport system 190 may have a conveying capacity of about 20,000 pounds per hour (about 9,100 kilograms per hour) for up to about 160 feet (about 48.8 meters). The sifter pneumatic transport system 190 may have a number of ninety-degree (90°) turns therein. The sifter pneumatic transport system 190 may be made out or steel or similar types of materials. The pneumatic transport system 190 may include a blower 200. The blower 200 may be a positive displacement rotary blower with about a thirty (30) horsepower motor. The blower 200 may use a silencer. The sifter pneumatic transport system 190 may have any desired size or operational parameters.

The discharge screw conveyor 160 of the raw material bins 120 may be directly connected to the sifter pneumatic transport system 190 via a hopper vent 210. The hopper vent 210 may be connected to the pneumatic transport system 190 via an inlet airlock or similar types of valve means. The inlet airlock may be operated by about a 1.5 horsepower motor at about 1800 rpm. Any size or speed motor may be used.

Alternatively, the screw feeders 160 of the raw material bins 120 also may be in communication with the pneumatic transport system 190 via a bulk packaging unit 220. The bulk packaging unit 220 may include a number of bulk bags 230. The bulk bags 230 may be made out of woven polypropylene, or similar types of materials.

The bulk bags 230 may be mounted within a bulk bag filling station 240. The bulk bag filling station 240 may include a load cell or similar types of weighing means. Once filled, the bulk bags 230 may be maneuvered from the bulk bag filling station 240 via a conveyor system 250. The conveyor system 250 may be made out of steel or similar types of materials. The conveyor system 250 may have a bag capacity of 4000 pounds (about 1814 kilograms). The bags 230 with the raw materials therein may be stored for a predetermined length of time. The conveyor system 250 may lead to a bulk bag unloader 260. The bulk bag unloader 260 may include a product hopper 270 and a discharge screw 280. The discharge screw 280 provides a smooth flow of the raw material therethrough. The discharge screw 280 may include about a five (5) horsepower motor. Any size motor may be used. The discharge screw 280, in turn, may be in communication with a hopper vent 290. The hopper vent 290 may be in communication with the sifter pneumatic transport system 190 via an inlet airlock or similar means.

The sifter pneumatic transport system 190 may lead to a cyclone receiver 300 associated with a sifter 320. The cyclone receiver 300 provides separation of the product from the conveying air stream. The cyclone receiver 300 may have an airlock positioned thereon. The airlock may have about a 1.25 horsepower motor that operates at about 180 rpm. Any size or speed motor may be used. The sifter pneumatic transport system 190 also may have an exhaust fan to aspire the bypass air from the cyclone receiver 300.

The cyclone receiver 300 may lead to the sifter 320. The sifter 320 may have a rotating cylinder with a sieve or a similar structure therein. The sifter 320 may operate at about 1800 revolutions per minute with about a 7.5 horsepower motor. Any size or speed motor may be used. The sifter 320 ensures that the raw material stream is evenly distributed.

Positioned adjacent to the sifter 320 may be a magnet 330. The magnet 330 may be a double row drawer magnet or a similar structure. The magnet 330 may assist with the gravity flow of the raw material stream from the sifter 320. The magnet 330 also may remove impurities in the raw material stream.

Positioned beneath the magnet 330 may be a raw material bin 340. The raw material bin 340 may be made out of steel and may have a usable capacity of about 200 cubic feet (about 5.7 cubic meters). Any size or shape may be used. The raw material bin 340 may have an inspection port therein as well as high and low level probes. The raw material bin 340 may include a vibrating discharger 350. The vibrating discharger 350 may be similar to the vibrating discharger 150 described above. The vibrating discharger 350 may lead to a discharge screw conveyor 360. The discharge screw conveyor 360 provides controlled flow from the raw material bin 340. The discharge screw conveyor 360 may have about a two (2) horsepower motor. The discharge screw conveyor 360 may be similar to the discharge screw conveyors 160 described above.

The breadcrumb manufacturing system 100 also may include a mixing station 400. The mixing station 400 may be fed via gravity from the raw material bin 340 and the discharge screw conveyor 360. The mixing station 400 may include a gravimetric feeder 410. The gravimetric feeder 410 may be a single screw feeder. The gravimetric feeder 410 also may have modular differential proportioning scale. The gravimetric feeder 410 may be made out of stainless steel or similar types of material.

The gravimetric feeder 410 may be in communication with a mixer 420. The mixer 420 may include a number of paddle screws with adjustable paddles. The mixer 420 may include about a 7.5 horsepower motor. Any size or speed motor may be used. The mixer 420 may be made out of stainless steel. The mixer 420 may be in communication with a water addition system 430. The water addition system 430 provides water to the mixer 420. The mixer 430 mixes the incoming raw material stream with a predetermined amount of water.

The breadcrumb manufacturing system 100 also may include an extrusion station 450. The extrusion station 450 may include an extruder 460. The extruder 460 may be sold by Buhler Ltd. of Uzwil, Switzerland. The extruder 460 may include two (2) overhung, co-rotating, intermeshing screw shafts. The screws may scrape material off each other and off the barrel wall. The screws may have a speed of about 300 to about 500 revolutions per minute. The extruder 460 may have a screw diameter of about four (4) to about five (5) inches (about 102 to about 127 millimeters).

The extruder 460 may include about a 750 horsepower motor within a control range of about 1-10. Any size or speed motor may be used. The materials may pass through the extruder 460 at about 6614 pounds to about 9920 pounds per hour (about 3000 to about 4500 kilograms per hour). The extruder 460 may be heated and operate over a temperature range of about 158 to about 338 degrees Fahrenheit (about 70 to about 170 degrees Celsius). The extruder 460 may have any desired size or operational parameters. The extruder 460 thus may be self-cleaning. The extruder 460 may be computer controlled by an Allen Bradley PLC or a similar type of control device.

The extruder 460 may be gravity fed from the mixing station 400. The extruder 460 may have one or more raw material inlets 465 and a number of liquid inlets 470. The liquid inlets 470 permit the addition of further water or oil to the raw material stream so as to transform the stream into a continuous dough mass. The dough is then cooked and chopped within the extruder 460. The extruder 460 may include at least one vent for withdrawing moisture from the cooked dough. The extruder 460 also may include a die positioned on one end thereof. The die may have a diameter of about 0.3 inches (about 8 millimeters), although any diameter may be used.

As described above, the heat of the friction, the screw configuration, the speed of the screws, the size of the die, and the nature of the ingredients all may vary depending upon the intended final product. Other variables may include temperature, pressure, torque, and moisture levels.

Adjacent to the die of the extruder 460 may be a cutter 480. The cutter 480 may include a rotating knife head. Three (3) cutter knives may be used. The cutter 480 may have a speed of about 500 to about 2000 revolutions per minute, although any speed may be used. The cutter 480 may cut the marshmallow like dough mass into mini loaves of bread. The product loaves may be about 0.39 to about 1.57 inches in diameter (about 10 to about 40 millimeters) and about 0.39 to about 1.97 inches in length (about 10 to about 50 millimeters).

The product loaves may exit the extruder 460 and may be transported via a dryer pneumatic transport system 490. The dryer pneumatic transport system 490 may include a high-pressure fan to provide the necessary vacuum to move the product loaves therethough. The dryer pneumatic transport system 490 may have a capacity of about 13,125 pounds per hour (about 5950 kilograms per hour) of the extruded product loaves. The conveying distance may be about fifty (50) feet. Several 90-degree turns may be used. The dryer pneumatic transport system 490 may have any desired size or operational parameters.

The dryer pneumatic transport system 490 may connect the extrusion station 450 with a drying station 500. The drying station 500 may include a cyclone receiver 510. The cyclone receiver 510 may be made out of stainless steel or similar types of materials. The cyclone receiver 510 may be similar to the cyclone receiver 300 described above.

The drying station 500 also may include a fluid bed dryer 530. The fluid bed dryer 530 may be a DNTW-1006 type fluid bed dryer provided by Buhler of Uzwil, Switzerland. The fluid bed dryer 530 may be made of stainless steel or similar types of materials. The fluid bed dryer 530 may include an inlet system section 540 for the entry of the product loaves from the cyclone receiver 510.

The fluid bed dryer 530 also may have a number of modular drying sections 550. Any number of sections 550 may be used. The drying sections 550 may be heated via one or more heaters 560. Each heater 560 may be a direct-fired gas heater. The heaters 560 may operate in conjunction with a hot air blower 570.

The modular drying sections 550 may have a temperature of about 140 to about 176 degrees Fahrenheit (about 60 to about 80 degrees Celsius) so as to reduce the temperature of the product loaves as they pass therethrough. Alternatively, the modular drying sections 550 may have a temperature of over 482 degrees Fahrenheit (about 250 degrees Celsius) to toast the outside of the product loaves. The heaters 490 may have any desired size or operational parameters. Other types of heating units may be used.

The drying section 550 of the fluid bed dryer 530 may have a conveying system to convey the product loaves therethrough. The conveyors may use a system of flights therein. The drying section 550 may include a number of pulsators with variable speed motors. The product loaves may spend about 75 to about 120 seconds within the fluid bed dryer 530, although any desired time may be used. The fluid bed dryer 530 also may include a discharge section.

The fluid bed dryer 530 also may have a number of filters 580. The filters 580 may be reverse pulse filters with a number of bags therein so as to trap product dust and other materials. A high-pressure exhaust fan also may be used.

The product loaves may exit the fluid bed dryer 530 via a temperer pneumatic transport system 600. The temperer pneumatic transport system 600 may have a horizontal conveying length of about 60 feet (about 18.3 meters) and a vertical width of about 70 feet (about 21.3 meters). The temperer pneumatic transport system 600 may be made out of stainless steel and may have several 90° turns. The temperer pneumatic transport system 600 may include a high-pressure fan to provide the necessary vacuum to move the product loaves therethrough. The temperer pneumatic transport system 600 may have a capacity of about 15,750 pounds per hour (about 7150 kilograms per hour). The temperer pneumatic transport system 600 may have any desired size or operational parameters.

The temperer pneumatic transport system 600 may move the product loaves from the fluid bed dryer 530 to a cyclone receiver 620 associated with one or more temperers 630. The cyclone receiver 620 may be similar to those described above and made out of stainless steel or similar types of materials.

The product loaves may drop from the cyclone receiver 620 under the force gravity into the temperers 630. The temperers 630 may be belt type coolers such as the DNTK-2-14K model provided by Buhler of Uzwil, Switzerland. Depending upon the desired final product, the temperers 630 may run at ambient temperature. Alternatively, the temperers 630 may be heated via the heaters 560 described above. Any desired temperatures may be used. The temperers 630 may include a number of drive belts 640 therein. The belts 640 are driven such that the product loaves may have a dwell time of about one (1) hour. The length of the belt time may be varied.

The temperers 630 also may have one or more cyclone separators in communication therewith. The cyclone separators may be similar to those described above. The cyclone separators may separate dust from the aspiration air stream. The cyclone separators may be made from stainless steel or similar types of materials. The temperers 630 also may have an aspiration fan in communication therewith. The aspiration fan may include about a 100 horsepower motor. The aspiration fan may include a silencer. Any desired size or operational parameters may be used.

The product loaves may exit the temperers 630 and fall into a chopping pneumatic transport system 680. As with the temperer pneumatic transport system 600 described above, the chopping pneumatic transport system 680 may include a high-pressure fan so as to pull the necessary vacuum to convey the product loaves from the temperers 630. The chopping pneumatic transport system 680 may have a horizontal conveying length of about twenty-five (25) feet (about 7.6 meters). The chopping pneumatic transport system 680 may include a number of 90-degree turns. The chopping pneumatic transport system 680 may have a capacity of about 14,000 pounds per hour (about 6350 kilograms per hour). The chopping pneumatic transport system 680 may have any desired size or operational parameters.

A metal detector 650 also may be positioned about the chopping pneumatic transport system 680. The metal detector 650 may be used to detect the presence of metal in the free fall of the product stream. A cowbell style reject diverter may be used. Any conventional design may be used.

The breadcrumb manufacturing system 100 also may have a chopping station 750. The chopping pneumatic transport system 680 may be in communication with a cyclone receiver 755 associated with the chopping station 750. The cyclone receiver 755, similar to those described above, may be made out of stainless steel or similar materials. The cyclone receiver 755 permits the accumulation of the product loaves.

The chopping station 750 may have a flow splitter 760 in communication with the cyclone receiver 700. The flow splitter 760 may be a vibratory distributor. The flow splitter 760 may be made out of stainless steel. The flow splitter 760 may provide for a uniform distribution of the product loaves.

The flow splitter 760 may be in communication with a number of cutters 770. The cutters 770 may slice or shred the product loaves into product crumbs. In this example, a number of rotating cutters 770 may be used. For example, the cutters 770 may have one impeller and two cutting heads each. The cutters 770 may operate at a high rate of speed, approximately 3000 to about 5600 revolutions per minute. The cutters 770 may have any desired size, speed, or other operational parameters.

A second or further set of the cutters 780 also may be used. Any desired number of cutters 770 may be used. The second set 780, if used, may provide a smaller chop to reduce the size of the product crumbs according to the desired final product. For example, a course chop may be followed by a smaller chop. The size of the chop, the cut, or the grind may be varied. The nature of the cutting heads also may be varied. The second set of cutters 780 may be by-passed if desired.

The breadcrumb manufacturing system 100 further may include a drying station 800. The product crumbs may fall under the force of gravity from the chopping station 750 to the drying station 880. The drying station 800 may include a number of fluid bed dryers 810. The fluid bed dryers 810 may be manufactured by Buhler of Uzwil, Switzerland. The fluid bed dryers 810 reduce the moisture content in the product crumb via airflow and heat if desired.

In this example, four (4) fluid bed dryers 810 may be used, a first fluid bed dryer 811, a second fluid bed dryer 812, a third fluid bed dryer 813, and a fourth fluid bed dryer 814. An air supply fan 820 may supply each fluid bed dryer 810. The air supply fan 820 provides the necessary air for the fluid bed dryer 810 to maintain a fluid bed. The air supply fan 820 may have about a forty (40) horsepower motor. Each fluid bed dryer 810 also may have a heater 830 for direct heating of the drying air. The heaters 830 may be direct-fired gas heaters. Varying temperatures may be used. For example, the temperature may range from about 86 to about 194 degrees Fahrenheit (about 30 to about 90 degrees Celsius). The fluid bed dryers 810 may have a capacity of about 12,750 pounds per hour (about 5780 kilograms per hour). The fluid bed dryers 810, and the components thereof, may have any desired size or operational parameters.

Each fluid bed dryer 810 may have a material bed 840 therein. The product loaves may be maneuvered across the bed 840 by pulses from the air supply fan 820 and the heater 830. The gas stream may be introduced in pulses into the bed 840, thus briefly fluidizing the product crumbs at rates or intervals. The conveying speed depends upon the frequency of the pulsation, the velocity of the gas acting on the bed 840 and factors specific to the products therein. The temperature and the airflow may be adjusted within the fluid bed dryers 810. The product crumbs may pass through one or more of the fluid bed dryers 810 depending upon the final product. The material bed may have any desired size or operational parameters.

Each fluid bed dryer 810 also may include a filter. Each filter may be a reverse pulse type filter with a filter bag position therein. The filter bags may catch and trap dust and other materials from the fluid bed dryers 810. Each filter also may have an exhaust fan. The exhaust fan may have about a thirty (30) to a sixty (60) horsepower motor. Any size fan may be used.

The product crumbs may leave the drying station 800 via a bucket elevator 870. The elevator 870 may elevate the product crumbs from the drying station 800 and may provide for general handling of the product crumbs. The elevator 870 may have the capacity of about 10,500 pounds per hour (about 4763 kilograms per hour). Any other capacity also may be used. The elevator 870 may be made out of steel or similar materials. The elevator 870 may have buckets therein. The buckets may be made out of material approved for food processing applications. The bucket elevator 870 also may include or lead towards a product splitter 880. The product splitter 880 may divide the product stream as desired.

The breadcrumb manufacturing system 100 further may include a sifting and packaging station 900. The sifting and packaging station 900 may include a sifter 910. Depending upon the desired size of the final product, the product crumbs may travel through the sifter 910 or bypass the sifter 910. The sifter 910 may be made out of steel. The sifter 910 may include one or more sieve frames. The sifter 910 may include a number of discharge spouts. The sifter 910 may be used to separate product crumbs of different sizes. The sifter 910 may have any desired size or operational parameters.

Similarly, the product crumbs may travel through one or more grinders 920 depending upon the desired size of the final product. The grinders 920 may included fluted or smooth rollers. For example, the grinders 920 may have rolls with a diameter of about 9.8 inches (about 250 millimeter) and a length of about 49.2 inches (about 1250 millimeters). The clearance between the respective grinder rolls may be varied depending upon the desired size of the final product. The grinders 920 may be driven by a number of thirty (30) horsepower, 1200 revolutions per minute motors. The grinders 920 may have any desired size, speed, or operational parameters.

Certain products crumbs also may be sent back through the sifter 910 depending upon the desired size of the final product. Such products may travel through a grinder pneumatic transport system 930 to a cyclone receiver 940 for collection. The cyclone receiver 940 may be similar to the cyclone receivers described above. The grinder pneumatic transport system 930 may be made out of stainless steel or similar materials. The grinder pneumatic transport system 930 may have a length of about sixty (60) feet (about 18.3 meters) and include a number of ninety-degree (90°) turns. The grinder pneumatic transport system 930 also may include a conveying fan to pull a necessary vacuum to re-elevate the product from the grinders 920 to the sifter 910. More than one cyclone receiver 940 may be used. The grinder pneumatic transport system 930, and the components thereof, may have any desired size or operational parameters.

The sifting and packaging station 900 also may have a number of product bins 970. In this case, a finished product bin 971, a course product bin 972, and a fine product bin 973. Any number of bins 970 may be used. Products of the desired shape will be forwarded either directly from the bucket elevator 870, the sifter 910, or the grinders 920. The finished product bin 971 may have a usable capacity of about 1650 cubic feet (about 46.7 cubic meters). The coarse product bin 972 may have about a 325 cubic feet capacity (about 9.2 cubic meters). The fine product bin 973 may have a capacity of about 285 cubic feet (about 8 cubic meters). The size of the bins 970 may be varied. The product bins 970 may have any desired size. The product bins 970 may be made out of stainless steel or similar types of materials.

Each product bin 970 may have a vibrating discharger 980 positioned thereon. Each vibrating discharger 980 may be made out of stainless steel or similar types of materials. Positioned beneath the vibrating dischargers 980 may be a discharge feeder 990. The discharge feeders 990 may be similar to the vibratory or screw feeders described above and may include about a 2.2 kilowatt gear motor. The discharge feeders 990 may have any size or operational parameter.

The sifter and packaging station 900 also may include one or more intermediate surge bins 1000. The intermediate surge bins 1000 may be positioned underneath the discharge feeders 990. The intermediate surge bins 1000 allow individual product feed control based upon weight. The intermediate surge bins 1000 may have a capacity of about 70 cubic feet (about 2 cubic meters). The intermediate surge bins 1000 may have any size or operational parameter.

Positioned underneath the intermediate surge bins 1000 may be a packaging carousel 1020. The packaging carousel 1020 may include a number of pneumatically operated bag spouts. The packaging carousel 1020 may have about a 2.2 kilowatt motor, although any size may be used. The packaging carousel may grab a bag 1030, fill the bag 1030 with product, and seal the bag 1030. The packaging carousel 1020 also may have an automatic bag-dropping device. The packaging carousel 1020 also may use an automatic bag attacher 1040. The packaging carousel 1020 may have any size or operational parameter.

As an alternative, the sifting packaging station 900 may include a number of bulk bag filler 1080. The bulk bag fillers 1080 also may hold a number of bags 1030. The bulk bag filler 1080 also may include a hopper scale 1050 positioned underneath. The hopper scale 1050 may have a number of load cells.

In use, the raw materials are loaded into the intake system 110. Specifically, the raw materials from the CFC are loaded into the raw material bins 120 via the intake pneumatic transport system 130. In turn, the raw material bins 120 may be discharged via the vibrating dischargers 150 and the discharge screw conveyor 160. The raw materials may be sent directly to the cyclone receiver 300 via the sifter pneumatic transport system 190 or the raw material may be stored as desired in the bulk bag 230 of the bulk bag filling station 240. The bulk bags 230 may later be emptied and the raw materials again led to the sifter pneumatic transport system 190.

The cyclone receiver 300 may lead to the sifter 320 and the magnet 330. The various types of raw material then may flow into the raw material bin 340. The raw material bin 340 also may have a vibrating discharger 350 and a discharge screw conveyor 360. The raw materials may fall under the force of gravity from the raw material bin 340 into the mixing station 400. The mixing station 400 may include the gravimetric feeder 410. From the gravimetric feeder 410, the materials may fall towards the mixer 420. The mixer may be in communication with the water addition system 430 so as to add a measure of water to the raw material mixture. The water content of the mixture may be about thirty-five to about forty-five percent (35-45%).

The mixture 420 then may fall towards the extrusion station 450 with the extruder 460 therein. The operational parameters for the extruder 460 may depend upon the final desired product. As described above, these variables may include the ingredients used, the speed of the screw, temperature, pressure, the diameter of the die, the speed of the cutter 480, and the number of cutter knives involved. Additional water may be added at the extruder 460 so as to turn the material flow into a continuous dough mass. The mass is then cooked within the extruder 460. The screw may add energy to the dough mass so as to provide an open cell structure. The cooked dough mass may resemble a marshmallow rope.

As the dough rope exits the extruder 460, the dough may be cut by the cutter 480 into the extruded shape resembling the mini-loaves of bread. The product loaves at this point may have a water content of about thirty to about thirty-eight percent (30-38%).

The product loaves in turn may exit the extruder and be transported via the dryer pneumatic transport system 490 to the drying station 500. Specifically, the product loaves may travel to the cyclone receiver 510 and then be distributed to the fluid bed dryers 530. The fluid bed dryers 530 serve to pull moisture from the outside of the individual product loaves.

The moisture content in the product loaves may be reduced to about twenty to about twenty-five percent (20-25%). Specifically, the fluid bed dryers reduce the temperature of the product loaves as they pass therethrough to about ambient. Alternatively, the fluid bed dryers may serve to toast the outside of the product loaves.

The product loaves may leave the fluid bed dryer 530 via the temperer pneumatic transport system 600 toward one or more temperers 630 via the cyclone receiver 620. The temperers 630 provide a dwell time to the product loaves. The dwell time preferably is about one (1) hour or so.

The product loaves may leave the temperers 630 via the vibratory feeder 670 and the chopping pneumatic transport system 680 towards the chopping station 750. As above, the chopping pneumatic transport system 680 may be in communication with the cyclone receiver 700. The metal detector 740 also may be positioned therein.

The flow of the product loaves may pass through the flow splitter 760 towards the cutters 770. The cutters 770 turn the product loaves into the product crumbs. The nature of the chop in the cutters 770 depends upon the desired final product. The second set of cutters 780 also may be used to provide a further or smaller chop. The second set of cutters 780 may or may not be required depending upon the desired characteristics of the final product.

The chopping station 750 may be in communication with a drying station 800. The drying station 800 may have a number of fluid bed dryers 810 positioned therein. The fluid bed dryers 810 fluidize the product crumbs as desired. The product crumbs may pass through one or more of the fluid bed dryers 810 depending upon the nature of the desired final product. The water content of the product crumbs may be reduced to about three to about ten percent (3-10%).

The product crumbs then may leave the drying station 800 via the bucket elevator 870 toward the sifting and packaging station 900. The sifting and packing station 900 may include the sifter 910 therein. The sifter 910 is used to separate the product crumbs of different sizes. Similarly, the product crumbs may travel through one or more of the grinders 920 depending upon the final desired size. Certain products may be sent through the sifter 910 and the grinder 920 more than once. The finished products then may be loaded into the finished product bins 970. The products then may be fed towards a packaging carousel 1020 or a bulk bag filler 1080.

The system 100 as a whole may produce about 6000 to about 10,000 pounds of product crumbs per hour (about 2721 to about 4536 kilograms per hour). The process as a whole may take about 0.5 to about 1.5 hours.

It should be understood that the foregoing relates only to the exemplary embodiments of the present invention and that numerous changes and modifications may be made herein without departing from the general spirit and scope of the invention as defined by the following claims and the equivalents thereof.

What is claimed is:

1. A system for manufacturing crumbs from a raw material mixture, comprising:
    an extruder for extruding the mixture to form loaves having a first size;
    said extruder comprising a cutter attached thereto;
    a first dryer for surface drying said loaves;
    a comminuting device separate from said extruder for comminuting said loaves to form crumbs having a smaller size than said loaves after drying;
    said comminuting device comprising a further cutter;
    wherein said further cutter comprises a first cutter for coarse cutting and a second cutter for fine cutting; and
    a second dryer for further drying said crumbs downstream of the comminuting device.

2. The system of claim 1, wherein at least said first dryer comprises a fluid bed dryer.

3. A system for manufacturing crumbs from a raw material mixture, comprising:
    an extruder for extruding the mixture to form loaves having a first size;
    said extruder comprising a cutter;
    a first dryer for surface drying said loaves;
    a comminuting device separate from said extruder for comminuting said loaves to form crumbs having a smaller size than said loaves after drying;
    said comminuting device comprising a further cutter; and
    a second dryer for further drying said crumb;
    wherein said comminuting device comprises said further cutter for a first size reduction and wherein said system further comprises a grinder downstream of said second dryer for a second size reduction.

4. The system of claim 1, further comprising a tempering chamber positioned between said extruder and said comminuting device.

5. The system of claim 1, further comprising a sizing device for sizing said crumbs.

6. The system of claim 1, further comprising a plurality of vertically extending transport lines connecting said extruder, said first dryer, said comminuting device, and said second dryer.

7. The system of claim 6, wherein said plurality of vertically extending transport lines comprises a plurality of pneumatic conveying lines.

8. The system of claim 6, wherein said plurality of vertically extending transport lines comprises gravity for conveying.

9. The system of claim 1, comprising in series said first dryer, a first cutter for coarse cutting, a second cutter for fine cutting, said second dryer, and a grinder.

10. The system of claim 9, further comprising a first bypass line connected between said first cutter and said second dryer for bypassing said second cutter and a second bypass line bypassing said grinder.

11. The system of claim 1, wherein said extruder is heated.

12. A system for manufacturing a plurality of product crumbs, comprising:
    an extruder for forming a plurality of product loaves;
    said extruder comprising a cutter attached thereto;
    means for drying said plurality of product loaves;
    means for tempering said plurality of product loaves;
    means for cutting separate from said extruder said plurality of product loaves into said plurality of product crumbs after drying;
    means for drying said plurality of product crumbs separate from said means for drying said plurality of product loaves and positioned after said means for cutting; and
    means for grinding said plurality of product crumbs.

13. The system of claim 12, further comprising means for sizing said plurality of product crumbs.

14. The system of claim 12, further comprising a plurality of pneumatic transport means.

15. A system for manufacturing a plurality of product crumbs, comprising:
    an intake station;
    an extrusion station;
    said extrusion station comprising a cutter attached thereto;
    a first drying station;
    a tempering station a cutting station separate from said extruder and downstream of said first drying station;

a further drying station downstream of the cutting station; and a grinder.

16. The system of claim 1, wherein the cutter comprises a speed of about 500 to 2,000 revolutions per minute.

17. The system of claim 1, wherein the further cutter comprises a speed of about 3,000 to 5,600 revolutions per minute.

* * * * *